US007052196B2

(12) United States Patent
Ueno et al.

(10) Patent No.: US 7,052,196 B2
(45) Date of Patent: May 30, 2006

(54) WIDTH AND LENGTHWISE DIRECTION TAPE PRINTING CONTROL DEVICE AND PROGRAM

(75) Inventors: Hideo Ueno, Nagoya (JP); Masaharu Mori, Anjo (JP); Jun Itakura, Nagoya (JP); Takeo Ito, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 10/529,617

(22) PCT Filed: Oct. 30, 2003

(86) PCT No.: PCT/JP03/13967

§ 371 (c)(1),
(2), (4) Date: Apr. 14, 2005

(87) PCT Pub. No.: WO2004/039596

PCT Pub. Date: May 13, 2004

(65) Prior Publication Data

US 2005/0271444 A1 Dec. 8, 2005

(30) Foreign Application Priority Data

Oct. 31, 2002 (JP) ............................ 2002-318840

(51) Int. Cl.
*B41J 11/26* (2006.01)
*B41J 5/30* (2006.01)
*B32B 31/00* (2006.01)

(52) U.S. Cl. ...................... 400/615.2; 400/62; 156/384

(58) Field of Classification Search .................. 400/62, 400/120.1, 615.2, 68, 621, 17, 613, 611, 63; 101/288; 156/384, 387; 358/1.15
See application file for complete search history.

(56) References Cited

U.S. PATENT DOCUMENTS 5,374,130 A 12/1994 Hirono ........................ 400/68
5,462,372 A 10/1995 Hirono .................... 400/615.2
5,549,399 A * 8/1996 Sakuragi et al. .............. 400/63
5,927,874 A * 7/1999 Kikuta et al. .......... 400/120.02
6,045,277 A * 4/2000 Kurashina et al. ....... 400/615.2
6,302,603 B1 * 10/2001 Akaiwa et al. ............. 400/613
6,371,670 B1 * 4/2002 Kojo ..................... 400/120.01

FOREIGN PATENT DOCUMENTS

JP 5050657 * 3/1993
JP 5229177 * 7/1993
JP 5298464 * 11/1993
JP 5305731 * 11/1993
JP A 6-247431 9/1994
JP A 6-320826 11/1994

(Continued)

*Primary Examiner*—Andrew H. Hirshfeld
*Assistant Examiner*—Wasseem H. Hamdan
(74) *Attorney, Agent, or Firm*—Oliff & Berridge, PLC

(57) ABSTRACT

A print image of a character string to be printed on a print tape, rotated counterclockwise from the lengthwise direction of the print tape by 90 degrees to be arranged in the width direction of the print tape, is generated (S450). The print image is repetitively arranged sequentially in the lengthwise direction of the print tape (S470) and thereby label printing is executed (S480). Subsequently (S500), a normal print image of the character string arranged in the lengthwise direction of the print tape is generated (S430) and label printing of the normal print image is executed (S480).

26 Claims, 9 Drawing Sheets

FOREIGN PATENT DOCUMENTS

| | | | |
|---|---|---|---|
| JP | 7205495 | * | 8/1995 |
| JP | 8072320 | * | 3/1996 |
| JP | 9202010 | * | 5/1997 |
| JP | 10000818 | * | 1/1998 |
| JP | 11254777 | * | 9/1999 |
| JP | 2000141774 | * | 5/2000 |
| JP | 20001855447 | * | 7/2000 |
| JP | 2001293910 | * | 10/2001 |
| JP | A 2001-277601 | | 10/2001 |
| JP | A 2001-519742 | | 10/2001 |

* cited by examiner

WIDTH AND LENGTHWISE DIRECTION TAPE PRINTING CONTROL DEVICE AND PROGRAM

TECHNICAL FIELD

The present invention relates to a tape printing device and a program which are used for printing a character string on a tape-like print medium.

BACKGROUND OF THE INVENTION

Tape printing devices, capable of printing a character string on a print tape made of an adhesive print sheet (with an adhesive agent previously applied on its back) and a releasable sheet which are bonded together to be releasable, are well known. The tape printing devices of this type are widely used for office use, home use, etc. because of their high usability allowing users to print a title, caption, etc. on the surface of a print sheet easily and beautifully. After printing a title, caption, etc. on the print tape, a user peels the print sheet away from the releasable sheet and sticks the print sheet (i.e. a label) on the spine of a file, videotape, etc.

Meanwhile, with the progress of computers and network technologies of recent years, there are many situations where numbers of plugs at ends of cables are plugged into numbers of sockets of a device. As a way to prevent faulty wiring in such cases, it is effective to put a label (with a character string printed thereon for identification) on each cable to be plugged into a socket.

Japanese Patent Provisional Publication No.HEI06-247431 (pages 5–7, Table 1) (hereinafter referred to as a “document #1”) has proposed a tape printing device which can set a necessary “wound part” in a label to be wound around a cable and print identical character strings on parts of the label outside the wound part in the lengthwise direction of the print tape. By winding the label (after being printed on by the tape printing device) around the cable while sticking its both ends together, the user can more surely recognize a socket into which the cable should be plugged.

However, when such a label printed on by the tape printing device of the document #1 is stuck on a cable, the part(s) printed with the character strings protrudes from the cable and that deteriorates the usability of the cable.

As a device capable of avoiding the above problem, Japanese Patent Provisional Publication No.HE106-320826 (pages 5–10, FIG. 14) (hereinafter referred to as a “document #2”) has proposed a tape printing device which can print a character string while rotating it from the lengthwise direction of the print tape by 90 degrees, by which a label having a character string printed in the width direction of the print tape can be created. Further, by cutting the print tape to a length suitable for winding it around the cable, a label leaving no part protruding from the cable can be created.

DISCLOSURE OF THE INVENTION

As described above, labels printed with character strings are generally applied on cables today in order to discriminate among a plurality of cables. Applying an identification label on a cable helps the user to recognize and identify the cable. However, with the identification label applied on the cable only, the user is not necessarily able to insert the plug of the cable into a correct socket. In order to increase the probability of correct insertion of numbers of plugs at the ends of cables into numbers of sockets, it is effective to further apply a label (printed with a character string identical with or similar to that on the label stuck on the cable) on a part in the vicinity of the socket, in addition to the label stuck on the cable. Since the part in the vicinity of the socket (into which the plug is inserted) is substantially flat, the label to be stuck on the part is desired to be an ordinary label on which the character string has been printed in the lengthwise direction of the print tape, differently from the label stuck on the cable. Therefore, it becomes necessary to create a label suitable for being stuck on a cylindrical member like a cable and a label (printed with a character string identical with or similar to that on the label stuck on the cylindrical member) suitable for being stuck on a flat part.

However, in order to create the label suitable for being stuck on a cylindrical member like a cable (plug side) and the label suitable for being stuck on a flat part like a part in the vicinity of a socket (socket side) with the tape printing device proposed in the document #2, data editing and printing operation have to be carried out for each of the labels and such work is troublesome to users. Especially when a great number of cables have to be connected to a line concentrator like a hub, multitudes of labels have to be printed with enormous labor of the user.

It is therefore the primary object of the present invention to provide a tape printing control device and a program realizing the creation of a label suitable for being stuck on a cylindrical member and a label (printed with a character string identical with or similar to that on the label stuck on the cylindrical member) suitable for being stuck on a flat part by one printing operation.

In order to achieve the above object, a tape printing control device provided by an aspect of the present invention comprises first storage means for storing a first character string to be printed on a tape-like print medium, first image generation means for generating a print image in which the first character string stored in the first storage means is arranged in a width direction of the tape-like print medium, second image generation means for generating a print image in which the first character string stored in the first storage means is arranged in a lengthwise direction of the tape-like print medium, and print control means for executing print control so that the print image generated by one of the first and second image generation means will be printed on the tape-like print medium first and thereafter the print image generated by the other will be printed on the tape-like print medium.

By the printing control device configured as above, a label having a character string printed thereon in the width direction of the print tape and a label having the character string printed thereon in the lengthwise direction of the print tape can be created by only one character string input and printing operation. Therefore, with the printing control device, two labels that can be suitably stuck on a cylindrical member like a network cable (plug side) and a flat part of a device like a hub into which the network cable is plugged (socket side) can be created with ease.

A program provided by another aspect of the present invention causes a computer to execute a first storage step for storing a first character string to be printed on a tape-like print medium, a first image generation step for generating a print image in which the first character string stored by the first storage step is arranged in a width direction of the tape-like print medium, a second image generation step for generating a print image in which the first character string stored by the first storage step is arranged in a lengthwise direction of the tape-like print medium, and a print control step for executing print control so that the print image generated by one of the first and second image generation steps will be printed on the tape-like print medium first and thereafter the print image generated by the other will be printed on the tape-like print medium.

By the program configured as above, a label having a character string printed thereon in the width direction of the print tape and a label having the character string printed thereon in the lengthwise direction of the print tape can be created by only one character string input and printing operation. Therefore, with the program, two labels that can be suitably stuck on a cylindrical member like a network cable (plug side) and a flat part of a device like a hub into which the network cable is plugged (socket side) can be created with ease.

Incidentally, such a program can be distributed to computers by storing the program in a removable record medium like a CD-ROM, FD, MO, etc. or a fixed record medium like a hard disk, or via a communication network like the Internet by use of a wired/wireless telecommunication means.

BEST MODE FOR CARRYING OUT THE INVENTION

Figure 1:
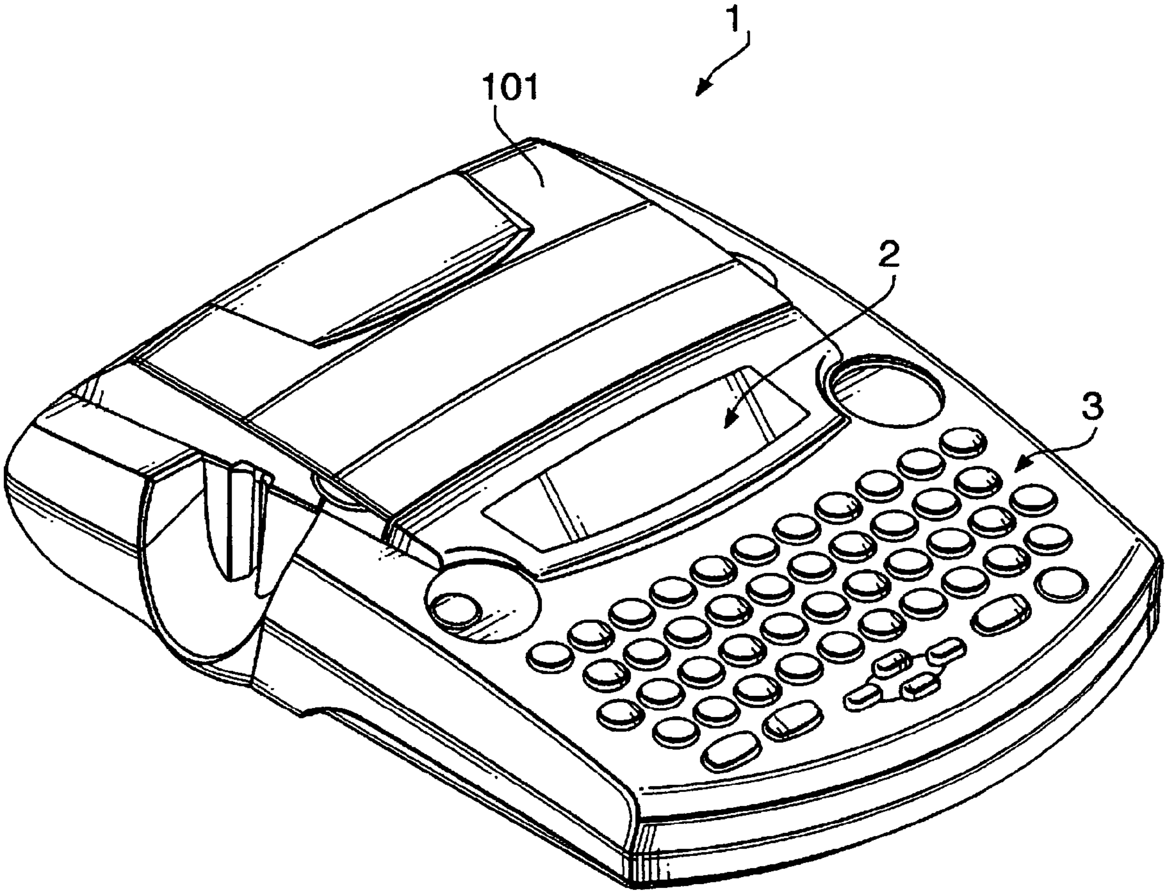
FIG. 1 is an external view of a tape printing device in accordance with an embodiment of the present invention.

Referring now to the drawings, a description will be given in detail of a preferred embodiment in accordance with the present invention.

FIG. 1 is an external view of a tape printing device 1 in accordance with an embodiment of the present invention. As shown in FIG. 1, the tape printing device 1 has a display 2 and a keyboard 3 which are arranged in a front part of its top surface. In the rear part of the tape printing device 1, a cover 101 is formed to be openable and closable. Inside the cover 101, a cassette storage part provided with a printing head 4 (see FIG. 3) is placed.

Print tape, as a print medium for the tape printing device 1, includes a print sheet as a long tape-like print medium (having a print surface (on which characters, symbols, etc. are printed) on its front and an adhesive material layer on its back) and a releasable sheet (having a releasable surface processed with silicone resin, etc.) which are stacked up to be releasable. The print tape is rolled up and stored in a tape cassette.

The tape cassette is loaded in the tape printing device 1 detachably. On a lateral face of the tape cassette, a tape exposing part is formed in order to expose the print tape for printing. The print tape inside the tape printing device 1 is pulled out from the tape cassette, printed on at the tape exposing part, and thereafter cut in an appropriate length. By peeling the print sheet (printed sheet) away from the releasable sheet, the user can use the print sheet as a label which can be stuck on an arbitrary object, article, etc.

The tape printing device 1 is capable of printing on the print tape in various styles. The print styles include "normal printing" in which a character string is printed being arranged in the lengthwise direction of the print tape. Besides the normal printing, the tape printing device 1 supports, for example, "cable wiring label printing", in which a character string arranged in the width direction of the print tape is printed and thereafter a character string arranged in the lengthwise direction of the print tape is printed. By the cable wiring label printing, the user can obtain a combination of labels to be suitably stuck on a cable (plug side) and a device (socket side, to which the cable should be connected) by only one printing operation.

Figure 2:
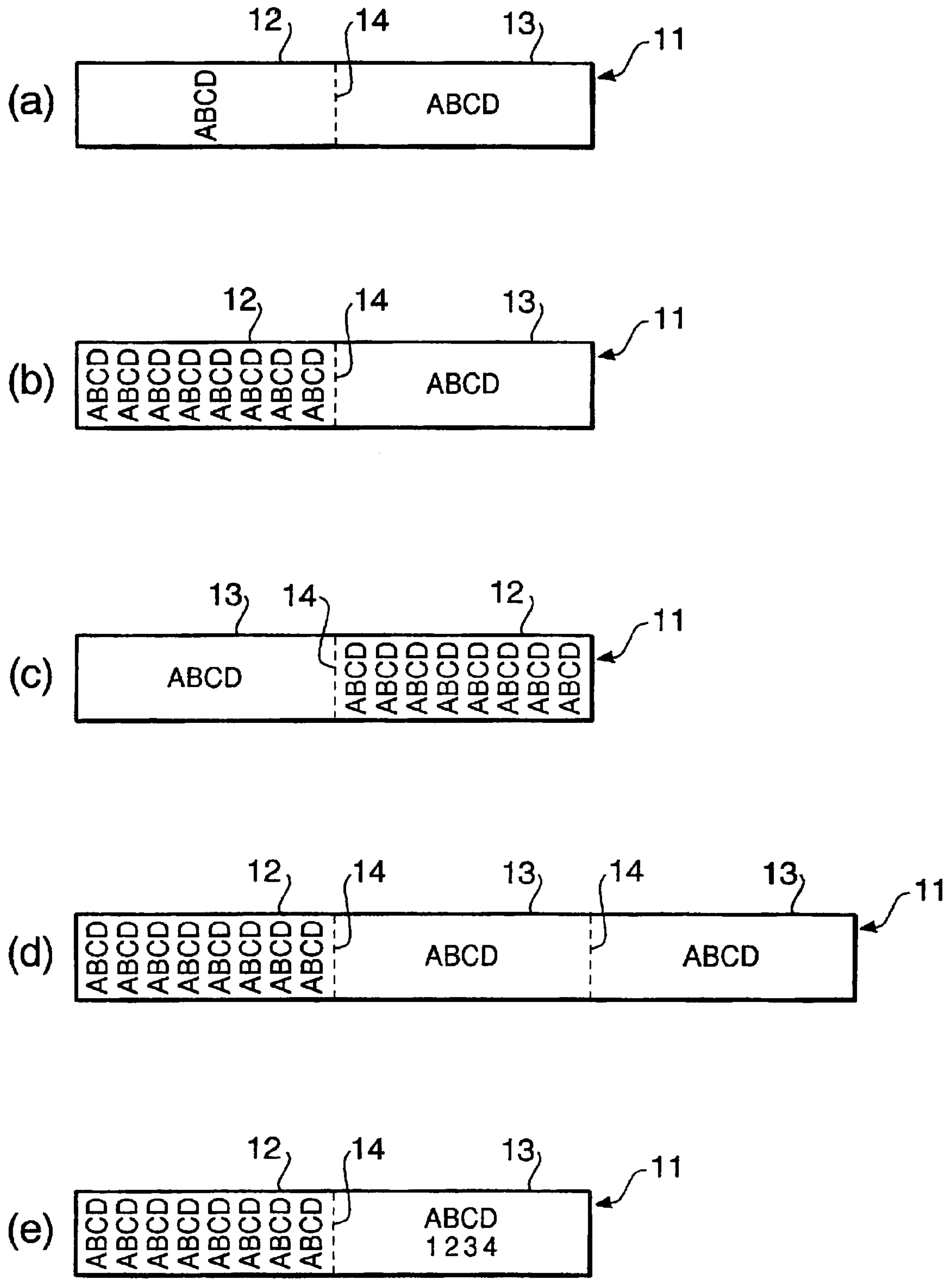
FIG. 2 shows examples of cable labels printed by the tape printing device of FIG. 1.

Next, a cable wiring label obtained by the cable wiring label printing by the tape printing device 1 (hereinafter referred to as a "cable label 11") will be explained below referring to FIG. 2. FIGS. 2(*a*) through 2(*e*) show examples of the cable label 11 created by the tape printing device 1. As shown in FIGS. 2(*a*) through 2(*e*), the cable label 11 includes a plug label 12 (part of FIG. 2(*a*) on the left side of the broken line) suitable for being wound around and stuck on a cable (plug side) and a socket label 13 (part of FIG. 2(*a*) on the right side of the broken line) suitable for being stuck on a flat part of a device (hub, line concentrator, etc.) in the vicinity of a socket to which the plug should be connected. As will be explained in detail later, the number of plug labels 12 and socket labels 13 forming the cable label 11, the order of printing, the number of character strings printed on a label, etc. can be set in the tape printing device 1.

The plug label 12 is stuck on a part of a cable (having a plug) close to the plug, by putting an end of the plug label 12 in its lengthwise direction (in the lengthwise direction of the print tape) on the part and winding the plug label 12 around the cable.

On the plug label 12, a character string for identifying the cable (plug), rotated counterclockwise from the normal printing direction by 90 degrees, is printed in the width direction of the print tape. FIG. 2(*a*) shows an example in which one character string for the identification of the cable (plug) is printed on the plug label 12.

FIG. 2(*b*) shows an example in which a plurality of character strings extending in the width direction are evenly arranged on the whole plug label 12 along the length of the print tape. In this case, the user can recognize the printed character strings irrespective of the visual angle around the cable.

The socket label 13 is a label to be stuck on a flat part of a device (hub, line concentrator, etc.) in the vicinity of a socket. On the socket label 13, a character string is printed in the lengthwise direction of the print tape similarly to the case of normal printing. Between the plug label 12 and the socket label 13 or between adjacent socket labels 13 (when a plurality of socket labels 13 are printed), a boundary line 14 parallel to the width direction of the print tape is printed (broken lines in FIGS. 2(*a*)–2(*e*)). Incidentally, it is also possible to provide the tape printing device 1 with an automatic cutter function to cut the print tape (full cut) or the print sheet only (half cut) between the plug label 12 and the socket label 13, instead of printing the boundary lines as in FIGS. 2(*a*)–2(*e*).

The cable label 11 can be a Type 1 cable label in which the same character string is printed both on the plug label 12 and on the socket label 13 (FIGS. 2(*a*)–2(*d*)) and a Type 2 cable label in which the socket label 13 is also printed with an extra character string which is added to the common character string integrally (FIG. 2(*e*)). The order of printing of the plug label 12 and the socket label 13 varies depending on a print setting in the tape printing device 1, and thus it is also possible to print the socket label 13 first as in the example of FIG. 2(*c*). Further, the cable label 11 is not limited to a combination of one plug label 12 and one socket label 13, that is, plug labels 12 and socket labels 13 can be printed in various combinations: 1 and 1, 1 and n, or n and n. FIGS. 2(*a*), 2(*b*), 2(*c*) and 2(*e*) show examples in which one plug label 12 and one socket label 13 are printed, while FIG. 2(*d*) shows an example in which one plug label 12 and two socket labels 13 are printed.

Figure 3:
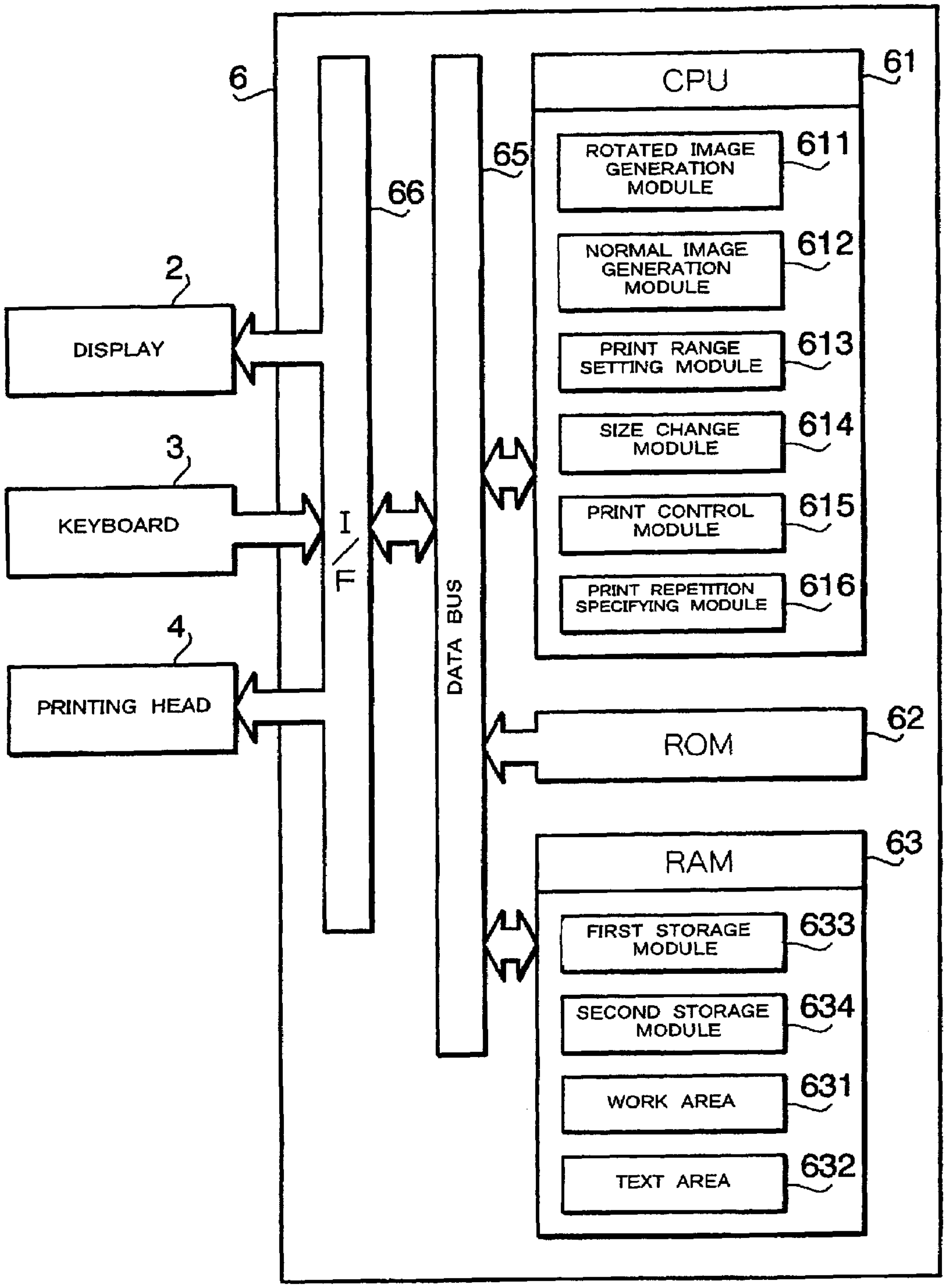
FIG. 3 is a block diagram showing the composition of a control system inside the tape printing device of FIG. 1.

Next, the internal composition of the tape printing device 1 will be described. FIG. 3 is a block diagram showing the composition of a control system inside the tape printing device 1. The tape printing device 1 includes the display 2, the keyboard 3, the printing head 4 and a control unit 6. The display 2 is implemented by a well-known liquid crystal display.

The keyboard 3 is placed on the top surface of the tape printing device 1 (see FIG. 1). The keyboard 3 includes text keys for inputting characters to be printed, cursor keys for moving a cursor, function keys (print key, etc.) for calling various functions of the tape printing device 1, etc.

The printing head 4 is installed in the cassette storage part of the tape printing device 1, at a position corresponding to the tape exposing part formed on a lateral face of each tape cassette. On the printing head 4, a number of heating elements electrically to be controlled by the control unit 6 are arranged in the width direction of the print tape (a direction orthogonal to the lengthwise direction of the print tape).

The control unit 6 includes a CPU (Central Processing Unit) 61, a ROM (Read Only Memory) 62, a RAM (Random Access Memory) 63, an interface unit 66 and a data bus 65. The CPU 61 executes calculations according to various commands. The ROM 62 stores programs for letting the CPU 61 carry out processes shown in FIGS. 4 through 6 (for implementing functional modules shown in FIG. 3), graphic data such as font data of characters and pattern data of frames for decorating printed characters, and various other data necessary for the execution of the programs. The RAM 63 is a volatile memory for temporarily storing data which are used by the CPU 61 for executing the programs.

The interface unit 66 is a connection part for electrically connecting the control unit with devices as separate modules directly or indirectly. The data bus 65 is a group of data transmission lines for electrically connecting the CPU 61, the ROM 62, the RAM 63 and the interface unit 66 together. All the data transmission in the control unit 6 is performed through the data bus 66.

Next, the functions of the tape printing device 1 will be described. As shown in FIG. 3, a work area 631, a text area 632, a first storage module (first storage means) 633 and a second storage module (second storage means) 634 are formed in the RAM 63 of the tape printing device 1. Meanwhile, a rotated image generation module (first image generation means) 611, a normal image generation module (second image generation means) 612, a print range setting module (print range setting means) 613, a character size change module (character size change means) 614, a print control module (print control means) 615, a print repetition specifying module (print repetition specifying means) 616 are included in the CPU 61.

The work area 631 is a memory area for temporarily storing data that are necessary when the CPU 61 executes various processes. The text area 632 is a memory area for storing character string data when a character string is inputted and edited.

The text area 632 stores text data of a character string associated with information on the font shape, character size, character decoration, frames, etc., in units of blocks. The "block" means a unit of inputting/editing a character string as an object of printing. Each block is set by use of a block change key as one of the function keys of the tape printing device 1. For setting a block, the user moves the cursor to a desired position in the inputted text and presses the block change key, by which a block change code is inserted at the end of the text data stored in the text area 632 and thereafter the character string inputting/editing can be carried out for each data (block) sandwiched by the block change codes. In the tape printing device 1, the settings of the print format and the print range can also be made in units of blocks. For example, when the user designates printing of a plurality of blocks or repetitive printing of a particular block, the printing of the block(s) is carried out successively in the lengthwise direction of the print tape. When no block setting has been made, all the character string on the input screen is regarded as one block.

When the cable wiring label printing has been designated, character string data of designated blocks are stored in the first storage module 633 and the second storage module 634.

The rotated image generation module 611 of the CPU 61 generates a print image of a character string (stored in the first storage module 633) rotated counterclockwise from the lengthwise direction of the print tape by 90 degrees. The "print image" means image data spread in the work area 631 of the RAM 63 based on the text data of the character string, the character size which has been set, the font shape, the presence/absence of line decoration such as the character decoration (boldface, oblique face, etc.) and frames, as dot pattern data of a block corresponding to actual print status of the block. The rotated image generation module 611 executes a coordinate transformation calculation process for rotating the spread print image counterclockwise by 90 degrees and stores the result in the RAM 63 again. For example, when the character string stored in the first storage module 633 is "ABCD", a print image generated by the rotated image generation module 611 is printed out as the character string in the plug label 12 shown in FIG. 2(*a*).

It is also possible to arrange a plurality of rotated character strings (rotated counterclockwise by 90 degrees) in a print range set by the print range setting module 613 (explained later) along the length of the print tape (hereinafter referred to as "sequential printing"). For example, when the character string stored in the first storage module 633 is "ABCD", the sequential printing of the character string gives a print result as the plug label 12 shown in FIG. 2(*b*). The number of repetitions in the sequential printing may be designated by the user or calculated automatically by the tape printing device 1 so that the whole print range will be printed with the character string "ABCD" sequentially.

Figure 5:
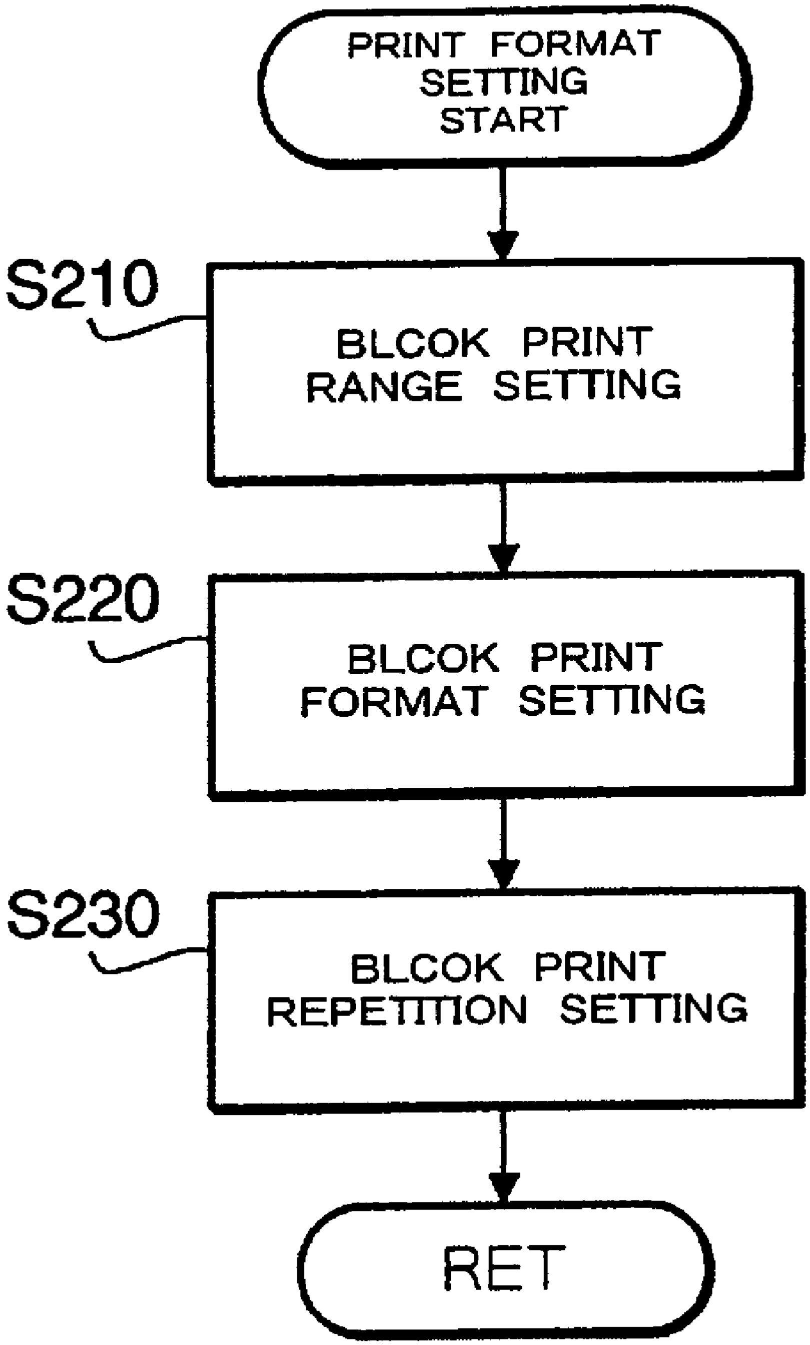
FIG. 5 is a flowchart showing a procedure of a print format setting executed by the tape printing device of FIG. 1.

What type of print image should be generated out of the above examples is determined according to the print format settings made by the user (see FIG. 5).

The normal image generation module 612 generates a print image so that the character string stored in the first storage module 633 will be arranged in the lengthwise direction of the print tape. The normal image generation module 612 is also capable of generating a combination (composite) print image by combining the character string stored in the first storage module 633 with a character string stored in the second storage module 634. For example, when the character string stored in the first storage module 633 is "ABCD" and the normal image generation module 612 generates a print image of the character string stored in the first storage module 633, the character string "ABCD" is printed along the length of the print tape as in the socket label 13 shown in FIG. 2(*b*). When the character strings stored in the first and second storage modules 633 and 634 are "ABCD" and "1234" respectively and the normal image generation module 612 generates a composite print image of the character strings stored in the first and second storage modules 633 and 634, the character strings "ABCD" and "1234" are printed in two lines in the lengthwise direction of the print tape as in the socket label 13 shown in FIG. 2(*e*). What type of print image should be generated out of the above examples is determined according to the print format settings made by the user (see FIG. 5).

Since two character strings combined together can be printed on the socket label 13 (on which character strings are printed in the lengthwise direction of the print tape), a socket label 13, having an explanatory comment, etc. thereon in addition to the character string printed on the label stuck on a cylindrical member (plug side), can be created with ease.

The print range setting module 613 sets print ranges (in the lengthwise direction of the print tape) for the print images generated by the rotated image generation module 611 and the normal image generation module 612. By the setting of the print ranges, the lengths of blocks to be printed (in the lengthwise direction of the print tape) are determined. The print range settings are made by the user in the print format settings (see FIG. 5). Each print range is set in terms of the length of a block to be printed. For the label part to be wound around a cylindrical member, the print range may also be specified in terms of the diameter of the cylindrical member, instead of the length of the block. In the case where the print range is set in terms of the diameter, the print range setting module 613 calculates the perimeter of the cylindrical member from the specified diameter and regards the perimeter as the print range.

Incidentally, the print range setting module 613 may also use a preset default value as the print range when no set value for the print range of a print image is given from outside.

Since the print ranges in the lengthwise direction of the print tape can be set for both the print images generated by the rotated image generation module 611 and the normal image generation module 612, the user is allowed to create the labels in desired lengths.

The size change module 614 changes the size of the print image generated by the rotated image generation module 611 or the normal image generation module 612. The size change module 614 automatically adjusts the print image size when the print image generated by the rotated image generation module 611 or the normal image generation module 612 does not fit in the print range set by the print range setting module 613. Possible methods for the print image size adjustment include a method generating the print image after adjusting the font size of each character. The methods for the print image size adjustment are not restricted to this example. For example, the adjustment may also be made by adjusting the character spacing or by directly compressing the print image.

When the cable wiring label printing has been selected, the print control module 615 carries out the print control so that a print image generated by one of the rotated image generation module 611 and the normal image generation module 612 will be printed first and thereafter a print image generated by the other will be printed. Therefore, by the function of the print control module 615, the print image generated by the rotated image generation module 611 and the print image generated by the normal image generation module 612 can be printed out by one printing operation while controlling the printing order of the print images. For example, in a case where a print image generated by the rotated image generation module 611 (implemented by the sequential printing of the character string "ABCD") is printed first and thereafter a print image generated by the normal image generation module 612 (including the character string "ABCD" arranged in the lengthwise direction of the print tape) is printed, the character string "ABCD" rotated is printed sequentially on the left side of the broken line (boundary line) 14 and the character string "ABCD" in the normal direction is printed on the right side of the broken line (boundary line) 14 as shown in FIG. 2(*b*). When the printing order is set reversely, the character string "ABCD" is printed normally on the left side of the broken line (boundary line) 14 and the character string "ABCD" rotated is printed sequentially on the right side of the broken line (boundary line) 14 as shown in FIG. 2(*c*). The order of printing is determined according to the print format settings made by the user (see FIG. 5).

The print repetition specifying module 616 specifies the number of printings (the number of times of printing) for both the print images generated by the rotated image generation module 611 and the normal image generation module 612. For example, in a case where the number of printings of the print image generated by the rotated image generation module 611 (implemented by the sequential printing of the character string "ABCD") is 1 and that of the print image generated by the normal image generation module 612 (implemented by the normal printing of the character string "ABCD") is 2, the character strings "ABCD" rotated are printed in a left-hand side part (out of the parts partitioned by broken lines 14) and the character string "ABCD" is printed normally in the middle part and in the right-hand side part as shown in FIG. 2(*d*). The number of printings is specified in the print format settings (see FIG. 5).

Next, processes to be executed by the tape printing device 1 of this embodiment will be described referring to FIGS. 4 through 8. The processes are carried out under the control by the CPU 61.

Figure 4:
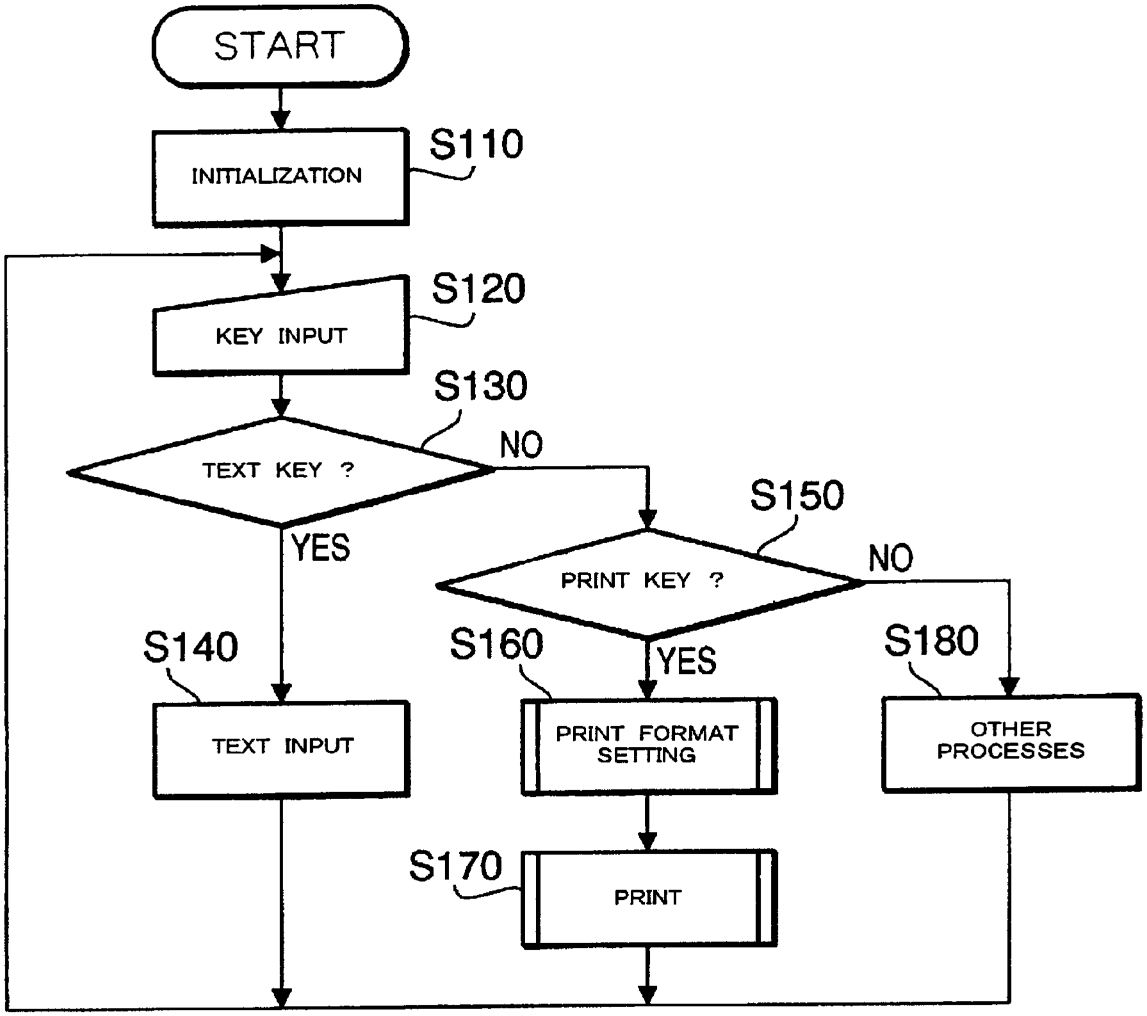
FIG. 4 is a flowchart showing an overall process executed by the tape printing device of FIG. 1.

FIG. 4 is a flowchart showing a process for the overall control of the tape printing device 1 (main flow). The tape printing device 1 starts operating when the power is turned on. First, in a step S110 (hereinafter abbreviated as "S110", ditto for the following steps), the whole tape printing device 1 is initialized. Specifically, the operation check and initialization of the CPU 61, the RAM 63 and the interface 66, the operation check of the display 2 and the printing head 4 connected to the interface 66, and the initialization of hardware are carried out. If no abnormality is found, the data stored in the RAM 63 and each functional module are initialized. After the initialization is finished, the CPU 61 displays an operation screen on the display 2. Next, the process advances to S120.

In S120, the CPU 61 waits for a key input by the user. The user can input text data to be stored in the text area 632 and operate the tape printing device 1 by making key inputs through the keyboard 3 while seeing a screen displayed on the display 2. The tape printing device 1 after the initialization stays on standby in a state allowing character inputs, in which the user can input characters and symbols to be printed out by pressing the text keys arranged on the keyboard 3. Even in the input standby state, the user can call various functions by pressing a function key such as a print key. When a key is pressed by the user, a key code corresponding to the pressed key is stored. Next, the process advances to S130.

In S130, the CPU 61 judges whether the key pressed in S120 is a text key based on the key code corresponding to the key. If the key is a text key (S130: YES), the CPU 61 executes a text input process (S140). The text input process means a process for obtaining a text code corresponding to the key code stored in S120 and storing the text code in the text area 632. After the text input process is finished, the process returns to S120 and the CPU 61 waits for a key input by the user.

Figure 6:
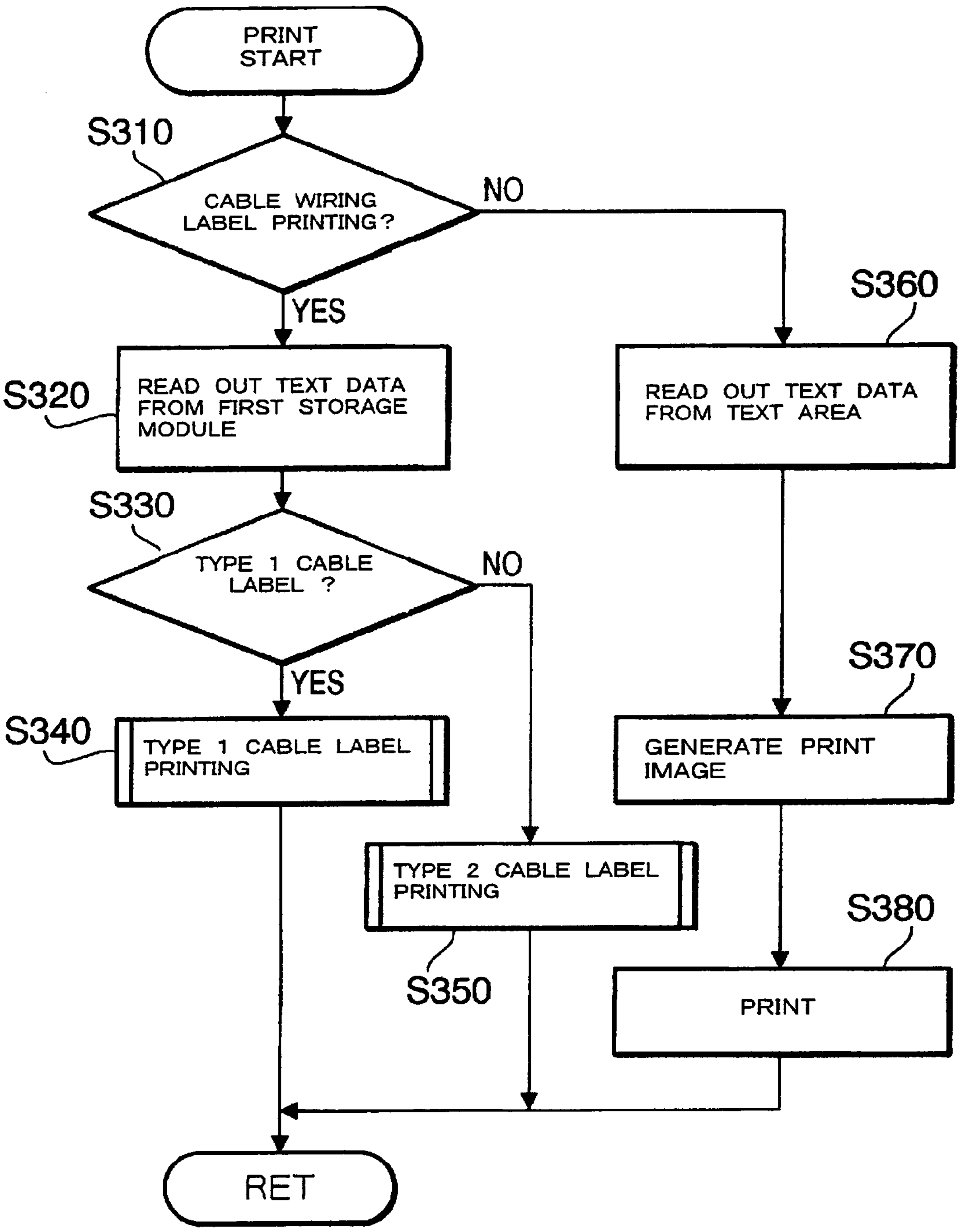
FIG. 6 is a flowchart showing a procedure of a print process executed by the tape printing device of FIG. 1.

If the key pressed in S120 is not a text key (S130: NO), the CPU 61 judges whether the key pressed in S120 is the print key (S150). If the key is the print key (S150: YES), the CPU 61 executes a print format setting which is shown in a flowchart of FIG. 5 (S160). The print format setting is a process for setting the format of characters in the printing, style or appearance as printed matter, etc. These settings can be made by the user. After the print format setting (S160) is finished, the process advances to S170 and a print process shown in a flowchart of FIG. 6 is executed. After the print process is finished, the process returns to S120 and the CPU 61 waits for a key input by the user.

If the key pressed in S120 is not a print key (S150: NO), the process advances to S180 and the CPU 61 executes other processes. The "other processes" include processes corresponding to functions keys other than the print key, processes corresponding to the cursor keys, etc. After the "other processes" are finished, the process returns to S120 and the CPU 61 waits for a key input by the user. The control system is ended by turning a power switch of the tape printing device 1 "OFF".

The procedure of the print format setting to be executed in S160 of FIG. 4 will be explained below referring to FIG. 5. FIG. 5 is a flowchart showing the procedure of the print format setting. As mentioned above, the print format setting is a process for setting the format of characters in the printing, style or appearance as printed matter, etc. The print format setting is carried out in units of blocks. In the process of FIG. 5, the print format setting is executed for data of a block that is currently displayed on the screen.

When the print format setting is started, the block print range setting by the print range setting module 613 is executed first (S210). In S210, the length of the block to be printed out is set. In the next S220, a block print format setting is executed, in which the print style of the block is set. The print style can be selected from various options depending on the purpose. Whether to create the cable label 11 (as a cable wiring label) is also determined in this step. When the user has selected the cable wiring label printing as the print style of the block to be printed out, setting items for the cable label 11 are also set in this step. After the block print format setting is finished, the process advances to S230.

Figure 9:
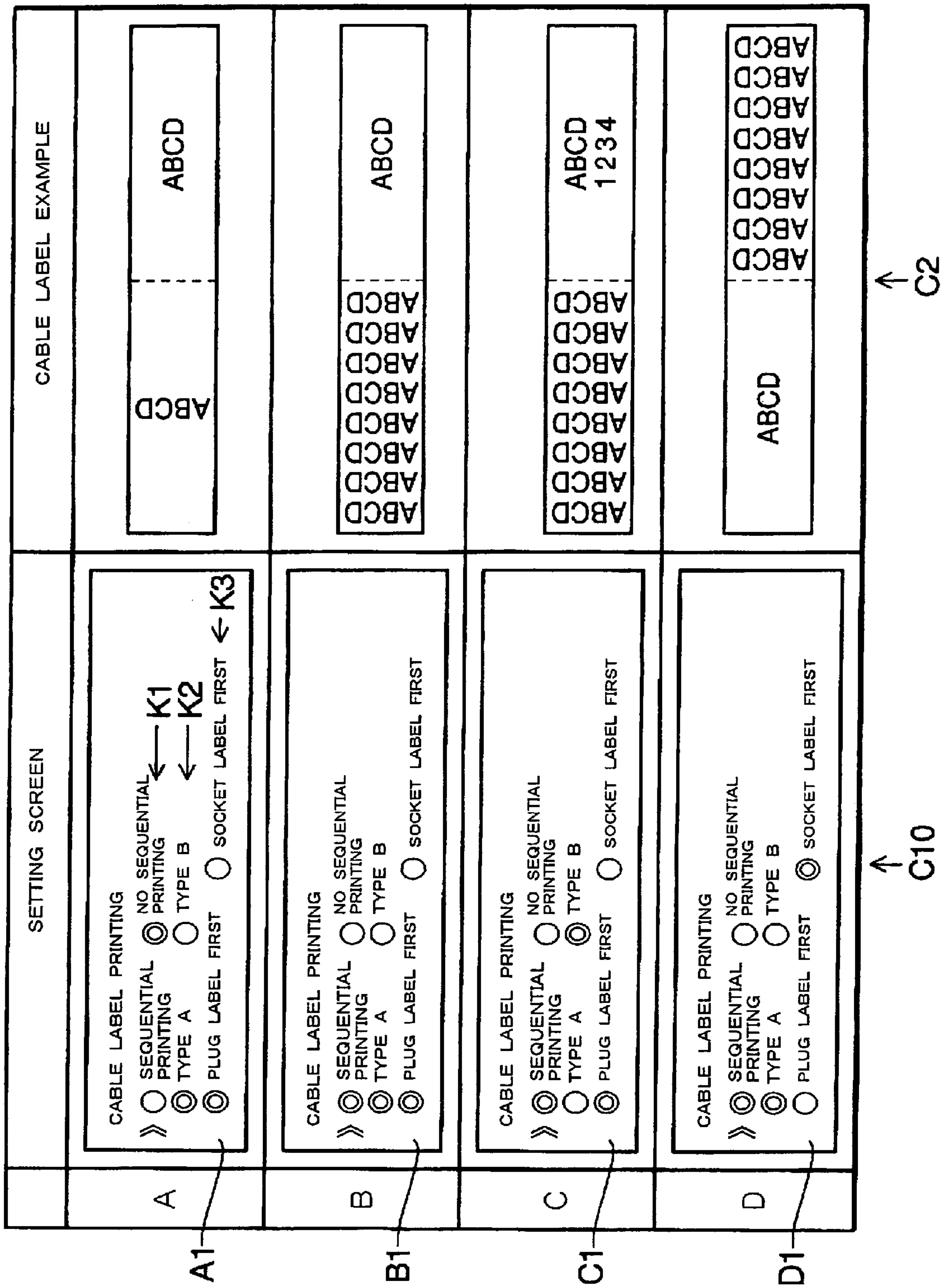
FIG. 9 is a schematic diagram showing the combinations of setting screens for cable label settings and cable label examples printed in response to the cable label settings in a table format.

Here, the settings for the cable label will be explained below referring to a table of FIG. 9. FIG. 9 is a schematic diagram showing the combinations of setting screens for the cable label settings (column C10) and cable label examples to be printed in response to the cable label settings (column C2) in a table format. As shown in each cell in the setting screen column C10 of FIG. 9, a cursor ">>" is displayed on the left of a setting item currently selected. The user can select an item by moving the cursor among the items by pressing the up/down cursor keys and change the setting of the selected item by pressing the right/left cursor keys.

As indicated with reference characters K1–K3 in FIG. 9, there are three cable label setting items.

The first item (with the reference character K1) is an item for setting whether to carry out the sequential printing of the character string for the plug label 12 in the whole print range set in the block print range setting by the print range setting module 613. In the setting item, the user selects "NO SEQUENTIAL PRINTING" (see a setting A1 in FIG. 9) when the sequential printing is unnecessary, or selects "SEQUENTIAL PRINTING" (see a setting B1 in FIG. 9) when the sequential printing is necessary. As shown in FIG. 9, a mark (double circle) is put on the selected item.

The second item (with the reference character K2) is an item for specifying the contents of the character string to be printed on the socket label 13. The user selects "TYPE A" in order to select the Type 1 cable label in which the socket label 13 is printed with the same character string as that on the plug label 12 (see the setting B1 in FIG. 9) or "TYPE B" in order to select the Type 2 cable label in which the socket label 13 is printed with an extra character string in addition to the character string on the plug label 12 (see a setting C1 in FIG. 9). In the case where "TYPE B" is selected, a character string inputted to a block next to the current block (for which the cable label settings are made) is used as the extra character string to be printed on the socket label 13. In other words, a block at the time of the cable label settings is regarded as the block for the plug label 12 and the next block is regarded as the block for the socket label 13.

The third item (with the reference character K3) is an item for letting the print control module 615 set the printing order of the plug label 12 and the socket label 13. The user selects "PLUG LABEL FIRST" when he/she hopes to create a cable label 11 having the plug label 12 and the socket label 13 printed in this order (see the setting B1 in FIG. 9) or "SOCKET LABEL FIRST" when he/she hopes to create a cable label 11 having the socket label 13 and the plug label 12 printed in this order (see a setting Dl in FIG. 9). The text area 632 is provided with a flag PA for storing the printing order of the plug label 12 and the socket label 13. The flag PA is set to "0" when the plug label 12 is to be printed first or "1" when the socket label 13 is to be printed first.

In S230, block print repetition is specified. The block print repetition means the number of printings of each block. In the case where the Type 1 cable label has been selected in the cable label settings, the character string to be printed on the plug label 12 and the socket label 13 has been inputted to one block; however, the block is imaginarily recognized in this step as two separate blocks and the number of printings is set separately for each of the blocks. Meanwhile, in the Type 2 cable label, the plug label 12 and the socket label 13 form independent blocks and thus the number of printings is set separately for each of the blocks. After the setting is finished, the process in the flowchart of FIG. 5 is ended and the control returns to S170 of the flowchart of FIG. 4. In this case, the character string data of the block to be printed on the plug label 12 is copied from the text memory 632 to the first storage module 633 when the cable label settings have been made. When the "combination" has been specified, the character string data in a block next to the block to be printed on the plug label 12 is copied from the text memory 632 to the second storage module 634.

Figure 7:
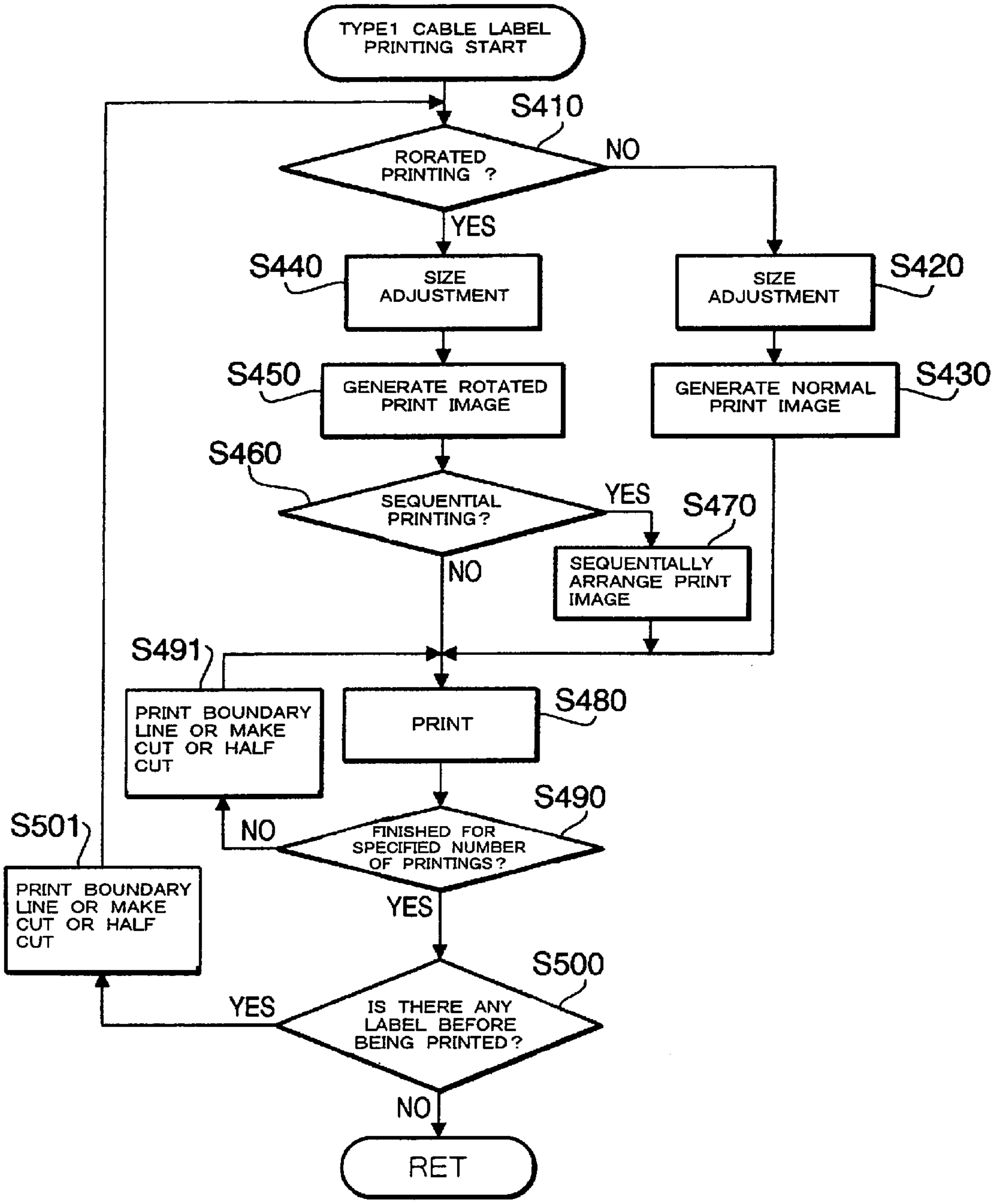
FIG. 7 is a flowchart showing a procedure of a Type 1 cable label printing process executed by the tape printing device of FIG. 1.

The procedure of the print process to be executed in S170 of FIG. 4 will be explained below referring to FIG. 6. FIG. 6 is a flowchart showing the procedure of the print process. The print process is executed for the block for which the aforementioned print format setting has been carried out. First, in S310, whether the print style set in S220 of FIG. 5 is the cable wiring label printing is judged. If the print style is the cable wiring label printing (S310: YES), the process advances to S320 and the CPU 61 reads out the text data from the first storage module 633 to the work area 631 of the RAM 63. In the next S330, the CPU 61 judges whether the print type is the Type 1 cable label printing. If the print type is the Type 1 cable label printing (S330: YES), a Type 1 cable label printing process shown in FIG. 7 is executed (S340). After S340 is finished, the process returns to S120 of the flowchart of FIG. 4. On the other hand, if the print type is not judged to be the Type 1 cable label printing (S330: NO), the process advances to S350 and the CPU 61 executes a Type 2 cable label printing process shown in FIG. 8. After S350 is finished, the process returns to S120 of the flowchart of FIG. 4.

If the print style is not judged to be the cable wiring label printing in S310 (S310: NO), the process advances to S360 and the CPU 61 reads out the text data as the object of printing from the text area 632 to the RAM 63 (S360). Subsequently, the CPU 61 generates a print image (made of dot pattern data) in the work area 631 of the RAM 63 from the text data according to necessary information as the character size, font shape, etc (S370). Thereafter, the CPU 61 carries out the printing on the print tape by driving the printing head 4, etc. in S380. After the printing in S380 is finished, the process returns to S120 of the flowchart of FIG. 4.

Next, the procedure of the Type 1 cable label printing process to be executed in S340 of FIG. 6 will be explained below referring to FIG. 7. FIG. 7 is a flowchart showing the procedure of the Type 1 cable label printing process. First, in S410, whether to execute rotated printing is judged. The judgment on the rotated printing is made based on the flag PA, that is, the rotated printing is executed when the flag PA is "0" while not executed when the flag PA is "1". If the flag PA is "1" (if the rotated printing is not executed) (S410: NO), the CPU 61 makes a size adjustment by adjusting the character size so that the print image will fit in the print range set by the print range setting module 613 (S420). In the next S430, a normal print image (in which the character string is arranged in the lengthwise direction of the print tape) is generated by the normal image generation module 612 of the CPU 61 (S430). Thereafter, the process advances to S480.

If the flag PA is judged to be "0" in S410, that is, when the rotated printing is executed (S410: YES), the process advances to S440 and the character size is adjusted so that the print image will fit in the print range set by the print range setting module 613 (S440). In the next S450, a rotated print image (in which the character string is rotated counterclockwise from the lengthwise direction of the print tape by 90 degrees) is generated by the rotated image generation module 611. In the next S460, whether to execute the sequential printing in the rotated printing is judged. When the sequential printing is not executed (S460: NO), the process advances to S480. When the sequential printing is executed (S460: YES), a character string part of the generated print image is repeatedly arranged sequentially and evenly along the length of the print tape in the print range set by the print range setting module 613. Thereafter, the process advances to S480.

In S480, the printing of the print image is carried out. In the next S490, whether the printing has been finished for the number of times specified by the print repetition specifying module 616 is judged. If the printing for the specified number of times has not been finished yet (S490: NO), a boundary line 14 is printed (S491) and the process returns to S480 to repeat the printing. If the printing for the specified number of times has been finished (S490: YES), the process advances to S500 and the CPU 61 judges whether both the plug label 12 and the socket label 13 of the cable label have been printed. If there is a label that has not been printed yet (S500: YES), the CPU 61 inverts the flag PA (from "0" to "1" or from "1" to "0") and prints a boundary line 14 again (S501). Thereafter, the process returns to S410 and the CPU 61 judges whether to execute the rotated printing for the next label. If it is judged that there remains no label yet to be printed (S500: NO), the Type 1 cable label printing process of the flowchart of FIG. 7 is ended and the process returns to S120 of the flowchart of FIG. 4.

Figure 8:
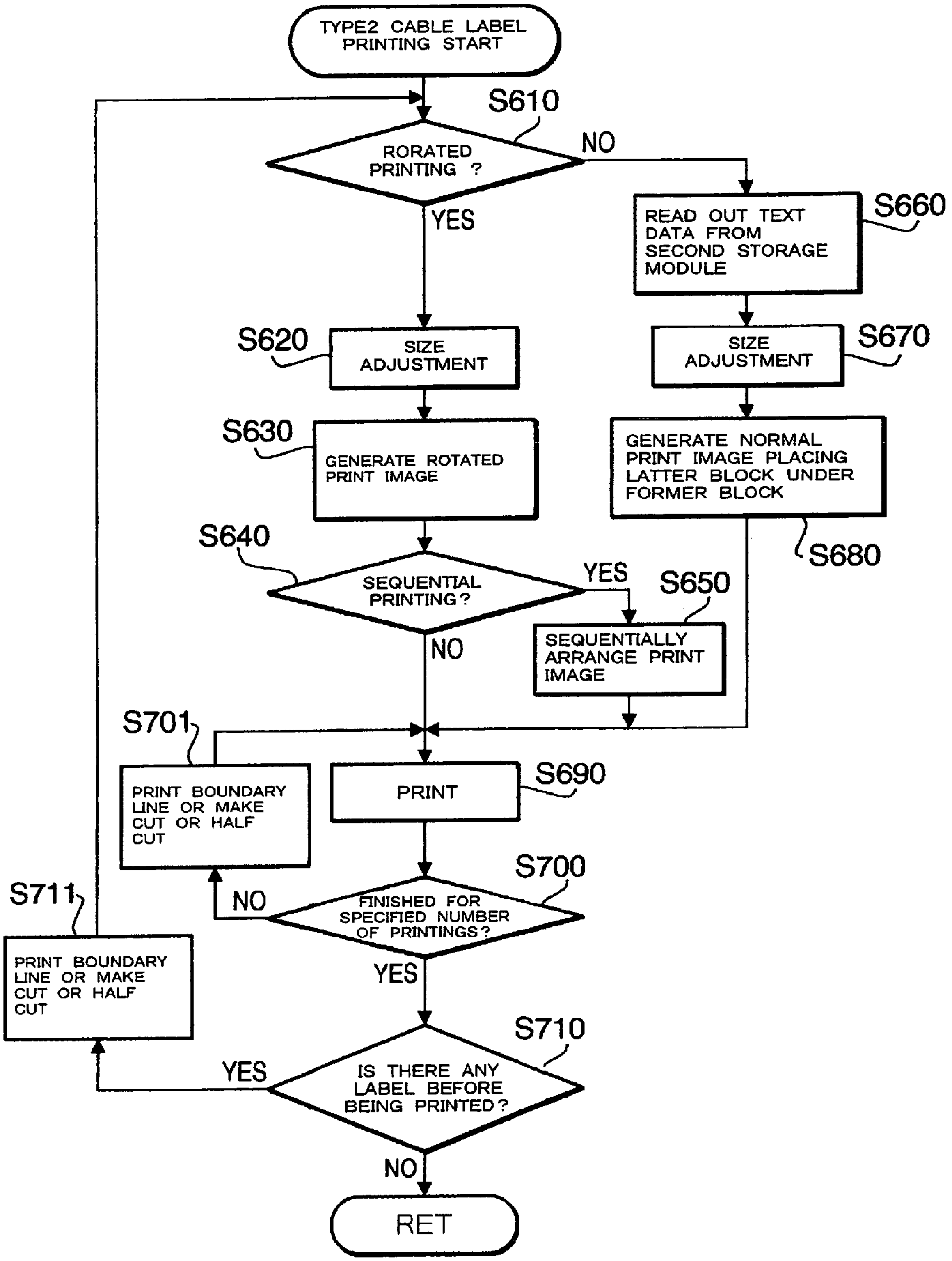
FIG. 8 is a flowchart showing a procedure of a Type 2 cable label printing process executed by the tape printing device of FIG. 1.

Next, the procedure of the Type 2 cable label printing process to be executed in S350 of FIG. 6 will be explained below referring to FIG. 8. FIG. 8 is a flowchart showing the procedure of the Type 2 cable label printing process. First, in S610, whether to execute rotated printing is judged. The combination cable label also includes a plug label 12 (made by the rotated printing) and a socket label 13 (made by the normal printing) similarly to the Type 1 cable label. Which label is printed first is determined according to the flag PA which has been set in the block print format setting (S220 in the flowchart of FIG. 5).

If the flag PA is judged to be "1" in S610 (if the rotated printing is not executed) (S610: NO), the CPU 61 reads out the text data stored in the second storage module 634 (S660). In the case of the Type 2 cable label, part of the character string to be printed on the socket label 13 has been stored in the second storage module 634, therefore, the part has to be read out from the second storage module 634. In the next S670, the CPU 61 adjusts the character size so that a print image made of the text data previously read out from the first storage module 633 and the text data read out from the second storage module 634 will fit in the print range set by the print range setting module 613. In the next S680, a normal print image, in which the character string read out from the second storage module 634 is arranged under the character string read out from the first storage module 633, is generated by the normal image generation module 612. Thereafter, the process advances to S690.

If the flag PA is judged to be "0" in S610, that is, when the rotated printing is executed (S610: YES), the character size of the character string read out from the first storage module is adjusted so that the print image made of the character string will fit in the print range set by the print range setting module 613. In the next S630, a rotated print image (in which the character string is rotated counterclockwise from the lengthwise direction of the print tape by 90 degrees) is generated by the rotated image generation module 611. In the next S640, whether to execute the sequential printing in the rotated printing is judged. When the sequential printing is not executed (S640: NO), the process advances to S690. When the sequential printing is executed (S640: YES), the process advances to S650 and a character string part of the generated print image is repeatedly arranged sequentially and evenly along the length of the print tape in the print range set by the print range setting module 613. Thereafter, the process advances to S690.

In S690, the printing of the print image is carried out. Thereafter, the process advances to S700 and whether the printing has been finished for the number of times specified by the print repetition specifying module 616 is judged. If the printing for the specified number of times has not been finished yet (S700: NO), a boundary line 14 is printed (S701) and the process returns to S690 to repeat the printing. If the printing for the specified number of times has been finished (S700: YES), the process advances to S710 and whether both the plug label 12 and the socket label 13 of the cable label have been printed is judged. If there is a label that has not been printed yet (S710: YES), the CPU 61 inverts the flag PA (from "0" to "1" or from "1" to "0") and prints a boundary line 14 again (S711). Thereafter, the process returns to S610 and whether to execute the rotated printing for the next label is judged. If there remains no label yet to be printed (S710: NO), the Type 2 cable label printing process of the flowchart of FIG. 8 is ended and the process returns to S120 of the flowchart of FIG. 4.

As described above, by printing the plug label 12 and the socket label 13 side by side with the rotated image generation module 611, the normal image generation module 612 and the print control module 616, a cable label 11 as a combination of the plug label 12 and the socket label 13 can be created in one printing operation. Therefore, the user is released from the trouble of creating separate labels to be stuck on a plug and a socket (printed with the same or similar character strings arranged in the width direction and the lengthwise direction of the print tape, respectively) and the efficiency of label making is increased. Further, since the print repetition specifying module 616 allows a plurality of plug labels 12 and/or socket labels 13 to be printed in a cable label 11, the same effects can be achieved even in cases where one plug corresponds to two sockets, one socket corresponds to two plugs, etc.

Moreover, since the label length can be set separately for the plug label 12 and the socket label 13 with the print range setting module 613, cable labels that can be applied to cylindrical members, flat members, etc. of various sizes can be created. When the plug label 12 printed with a plurality of character strings arranged sequentially and evenly in the set print range is stuck on a cylindrical member such as a cable, the user can recognize the printed character strings irrespective of the visual angle around the cylindrical member. The character string on each label is adjusted to a proper character size by the size change module 614, by which fine-looking labels can be created.

While the above description has been given of a preferred embodiment in accordance with the present invention, the present invention is not to be restricted by the above particular illustrative embodiment. Various modifications, design changes, etc. can be made to the embodiment without departing from the scope and spirit of the present invention described in the appended claims. For example, while the rotation of the character string is restricted to the 90-degree counterclockwise rotation in the above embodiment, it is possible to allow rotation of any desired angle.

While the print range setting module 613 in the above embodiment is configured to set the print ranges for both the print images generated by the rotated image generation module 611 and the normal image generation module 612, either or both of the print ranges may be set constant.

While the print image for the sequential printing is generated by arranging a plurality of identical print images in the above embodiment, it is also possible to generate one print image of character strings previously arranged for a plurality of lines.

While the tape printing device in the above embodiment is configured to adjust the size of each print image by the size change module 614, the tape printing device may also be configured to simply inform the user of an error when the print image does not fit in the print range, without employing the adjustment function.

While the data stored in the first and second storage modules 633 and 634 are text data in the above embodiment, the data are not restricted to text data. For example, image data generated by an external computer may be imported via a communication line, etc. and stored in the first and second storage modules 633 and 634.

While the tape printing device of the above embodiment is configured to be able to print two types of cable labels (Type 1 cable label, Type 2 cable label), the tape printing device is not restricted to this configuration. For example, the tape printing device may support only one type arbitrarily selected from the two types.

While the character strings to be printed out are processed in units of blocks in the above embodiment, the character strings may also be processed in units of other inputting/editing units as lines.

While the character strings stored in the first and second storage modules 633 and 634 are combined with each other and printed on the socket label 13 in the Type 2 cable label printing in the above embodiment, the socket label 13 may also be printed with the character string stored in the second storage module only.

While the tape printing device in the above embodiment is a device of a stand-alone type having the control unit incorporated in the tape printing device 1, the type of the tape printing device is not limited to the stand-alone type. For example, part or all of the control unit may also be implemented by a personal computer which is connected to the tape printing device 1 via an interface.

The procedure of each process described in the above embodiment can be implemented by a program which is executed by a computer. Such a program can be stored in record media of various types (flexible discs, CD-ROMs, etc.) in a format readable and executable by a computer.

It is to be appreciated that the above description of the embodiment has been given by way of illustration and the present invention is not to be restricted by the particular illustrative embodiment but to be understood based on the description of the appended claims.

What is claimed is:

1. A tape printing control device comprising:

a first memory that stores a first character string to be printed on a tape-like print medium;

a first image generator that generates a print image in which the first character string stored in the first memory is arranged in a width direction of the tape-like print medium;

a second image generator that generates a print image in which the first character string stored in the first memory is arranged in a lengthwise direction of the tape-like print medium; and a print controller that executes print control so that the print image generated by one of the first and second image generators will be printed on the tape-like print medium first and thereafter the print image generated by the other will be printed on the tape-like print medium.

2. The tape printing control device according to claim 1, further comprising a print range setting system capable of setting a print range in the lengthwise direction of the tape-like print medium for at least one of the print images generated by the first and second image generators.

3. The tape printing control device according to claim 2, wherein the print controller executes the print control so that the print image generated by the first image generator will be printed being repetitively arranged in the print range set by the print range setting system.

4. The tape printing control device according to claim 2, wherein the first image generator generates a print image in which an image of the first character string stored in the first memory, being arranged in the width direction of tape-like print medium, is repetitively arranged in the print range set by the print range setting system.

5. The tape printing control device according to claim 1, further comprising a second memory that stores a second character string to be printed on the tape-like print medium, wherein the second image generator generates a print image containing both the first character string stored in the first memory and the second character string stored in the second memory in one image.

6. The tape printing control device according to claim 1, further comprising a size change system that changes sizes of the print images generated by the first and second image generators.

7. The tape printing control device according to claim 2, further comprising a size change system that changes sizes of the print images generated by the first and second image generators corresponding to the print ranges set by the print range setting system.

8. The tape printing control device according to claim 1, further comprising a print repetition specifying system that specifies the number of printings for the print image generated by the first or second image generator.

9. The tape printing control device according to claim 1, wherein order of printing of the print image generated by the first image generator and the print image generated by the second image generator in the print controller is settable.

10. The tape printing control device according to claim 1, wherein the tape printing control device executes control for forming a mark allowing discrimination between the print images generated by the first and second image generators.

11. The tape printing control device according to claim 10, wherein the mark is formed by printing.

12. The tape printing control device according to claim 11, wherein the mark is formed by a printed line.

13. The tape printing control device according to claim 1, wherein the tape printing control device controls a cutting system so as to make a cut or half cut between the print images generated by the first and second image generators.

14. A computer program product comprising computer-readable instructions that cause a computer to execute:

a first storage step of storing a first character string to be printed on a tape-like print medium;

a first image generation step of generating a print image in which the first character string stored by the first storage step is arranged in a width direction of the tape-like print medium;

a second image generation step of generating a print image in which the first character string stored by the first storage step is arranged in a lengthwise direction of the tape-like print medium; and a print control step of executing print control so that the print image generated by one of the first and second image generation steps will be printed on the tape-like print medium first and thereafter the print image generated by the other will be printed on the tape-like like print medium.

15. The computer program product according to claim 14, further comprising computer-readable instructions that cause the computer to execute a print range setting step capable of setting a print range in the lengthwise direction of the tape-like print medium for at least one of the print images generated by the first and second image generation steps.

16. The computer program product according to claim 15, wherein the print control step executes the print control so that the print image generated by the first image generation step will be printed being repetitively arranged in the print range set by the print range setting step.

17. The computer program product according to claim 15, wherein the first image generation step generates a print image in which an image of the first character string stored by the first storage step, being arranged in the width direction of tape-like print medium, is repetitively arranged in the print range set by the print range setting step.

18. The computer program product according to claim 14, further comprising computer-readable instructions that cause the computer to execute a second storage step of storing a second character string to be printed on the tape-like print medium, wherein the second image generation step generates a print image containing both the first character string stored by the first storage step and the second character string stored by the second storage step in one image.

19. The computer program product according to claim 14, further comprising computer-readable instructions that cause the computer to execute a size change step of changing size of the print image generated by the first or second image generation step.

20. The computer program product according to claim 15, further comprising computer-readable instructions that cause the computer to execute a size change step of changing sizes of the print images generated by the first and second image generation steps corresponding to the print ranges set by the print range setting step.

21. The computer program product according to claim 14, further comprising computer-readable instructions that cause the computer to execute a print repetition specifying step of specifying the number of printings for the print image generated by the first or second image generation step.

22. The computer program product according to claim 14, wherein order of printing of the print image generated by the first image generation step and the print image generated by the second image generation step is settable in the print control step.

23. The computer program product according to claim 14, wherein the print control step further executes control for forming a mark allowing discrimination between the print images generated by the first and second image generation steps.

24. The computer program product according to claim 23, wherein the mark is formed by printing.

25. The computer program product according to claim 24, wherein the mark is formed by a printed line.

26. The computer program product according to claim 14, further comprising computer-readable instructions that cause the computer to execute a cutting step of making a cut or half cut between the print images generated by the first and second image generation steps.

* * * * *